(12) United States Patent
Goyal et al.

(10) Patent No.: US 7,738,503 B2
(45) Date of Patent: Jun. 15, 2010

(54) MULTI-WAY, PEER-TO-PEER SYNCHRONIZATION

(75) Inventors: Sidd Goyal, Boston, MA (US); Francis Thomas Riddle, Portsmouth, NH (US); Frank Judge, Haverhill, MA (US)

(73) Assignee: Palm, Inc., Sunnyvale, CA (US)

( * ) Notice: Subject to any disclaimer, the term of this patent is extended or adjusted under 35 U.S.C. 154(b) by 525 days.

(21) Appl. No.: 11/670,881

(22) Filed: Feb. 2, 2007

(65) Prior Publication Data

US 2008/0189440 A1    Aug. 7, 2008

(51) Int. Cl.
*H04J 3/06* (2006.01)
*G06F 15/16* (2006.01)

(52) U.S. Cl. ........................ 370/503; 709/248
(58) Field of Classification Search ......... 370/310, 370/503, 507, 509; 709/248
See application file for complete search history.

(56) References Cited

U.S. PATENT DOCUMENTS

| | | | |
|---|---|---|---|
| 5,870,680 A | | 2/1999 | Guerlin et al. |
| 5,884,323 A | | 3/1999 | Hawkins et al. |
| 6,000,000 A | | 12/1999 | Hawkins et al. |
| 6,006,274 A | | 12/1999 | Hawkins et al. |
| 6,311,209 B1 | | 10/2001 | Olson et al. |
| 6,324,544 B1 | * | 11/2001 | Alam et al. ............... 707/201 |
| 6,330,618 B1 | | 12/2001 | Hawkins et al. |
| 6,611,849 B1 | * | 8/2003 | Raff et al. ................. 707/203 |
| 6,633,759 B1 | | 10/2003 | Kobayashi |
| 6,728,786 B2 | | 4/2004 | Hawkins et al. |
| 6,892,210 B1 | * | 5/2005 | Erickson et al. ............. 707/201 |
| 6,999,792 B2 | | 2/2006 | Warren |

(Continued)

FOREIGN PATENT DOCUMENTS

EP    1 215 575    6/2002

(Continued)

OTHER PUBLICATIONS

Cohen, N. H., "A Java Framework for Mobile Data Synchronization", *Cooperative Information Systems: 7th International Conference CoopIS 2000; Eilat, Israel*, Sep. 2000; *Proceedings*, Lectures Notes in Computer Science 1901, Springer-Verlag, Berlin, 2000, 287-298, 12 pages.

(Continued)

*Primary Examiner*—Chi H Pham
*Assistant Examiner*—Warner Wong
(74) *Attorney, Agent, or Firm*—Fish & Richardson P.C.

(57) ABSTRACT

A method of synchronizing data elements between devices can include receiving at a first device, from only one of multiple peer devices with which the first device is configured to synchronize, a request to synchronize data between the first device and the only one peer device; identifying data elements stored in the first device that have changed since a previous synchronization operation between the first device and the only one peer device; and transmitting, directly and solely to the only one peer device, for each of the identified data elements, a local data identifier and a corresponding change to be applied to a data element in the only one peer device that corresponds to the local data identifier. In some implementations, each local data identifier is transmitted in a format in which it is maintained in the first device.

2 Claims, 10 Drawing Sheets

U.S. PATENT DOCUMENTS

| | | | |
|---|---|---|---|
| 7,320,010 B2 * | 1/2008 | Peng | 707/200 |
| 7,366,099 B2 * | 4/2008 | Shand | 370/235 |
| 7,366,796 B2 * | 4/2008 | Hall et al. | 709/248 |
| 7,523,146 B2 * | 4/2009 | Holt et al. | 707/203 |
| 7,542,485 B2 * | 6/2009 | Bingham et al. | 370/507 |
| 7,561,551 B2 * | 7/2009 | Metke et al. | 370/331 |
| 2002/0073139 A1 | 6/2002 | Hawkins et al. | |
| 2002/0151283 A1 | 10/2002 | Pallakoff | |
| 2003/0172070 A1 * | 9/2003 | Sawadsky et al. | 707/10 |
| 2004/0006551 A1 | 1/2004 | Sahinoja et al. | |
| 2004/0267741 A1 * | 12/2004 | Galindo-Legaria et al. | 707/5 |
| 2005/0135429 A1 * | 6/2005 | Bingham et al. | 370/503 |
| 2005/0229093 A1 * | 10/2005 | Campbell et al. | 715/500 |
| 2005/0256909 A1 * | 11/2005 | Aboulhosn et al. | 707/200 |
| 2006/0069809 A1 * | 3/2006 | Serlet | 709/248 |
| 2006/0242278 A1 | 10/2006 | Hawkins et al. | |
| 2007/0014314 A1 * | 1/2007 | O'Neil | 370/503 |
| 2007/0019682 A1 * | 1/2007 | Krzyzanowski | 370/503 |
| 2007/0140241 A1 * | 6/2007 | Asbun | 370/390 |
| 2007/0179989 A1 * | 8/2007 | Maes | 707/201 |
| 2007/0180075 A1 * | 8/2007 | Chasman et al. | 709/223 |
| 2008/0168183 A1 * | 7/2008 | Marcy et al. | 709/248 |

FOREIGN PATENT DOCUMENTS

| | | |
|---|---|---|
| EP | 1 330 098 | 7/2003 |
| WO | WO 99/26159 | 5/1999 |

OTHER PUBLICATIONS

"Go to my pc from anywhere with BeIaSync" available at http://www.beinsync.faq.php, last accessed Jan. 22, 2007, 20 pages.

SyncML Sync Protocol, version 1.1, Feb. 15, 2002, 62 pages.

SyncML Sync Representation Protocol, Data Synchronization Usage, version 1.1, Feb. 15, 2002, 66 pages.

SyncML White Paper, "Building an Industry-Wide Mobile Data Synchronization Protocol" available at http://xml.coverpages.org/SyncML-WhitePaper.pdf, last accessed Nov. 27, 2006, 14 pages.

"Windows Registry & PC Fix" available at http://hardware.mcse.ms/archive35-3005-7-211982.html.

"Microsoft Support WebCast Troublshooting Microsoft Exchange Server 2003 ActiveSunc Issues Mar. 25, 2004", available at http://support.microsoft.com/default.aspx?scid=%2Fservicedesks%2Fwebcasts%2Fen%2Ftranscripts%2Fwct032504.asp, 21 pages.

* cited by examiner

| Operation | Identifier | Counter Value |
|---|---|---|
| Modify | i | 29859 |
| Modify | ii | 29859 |
| | | |
| | | |
| | | |
| | | |
| | | |

261

| Synchronization Counter |
|---|
| 29859 |

266

| Device | Counter Value |
|---|---|
| Smartphone | 29858 |
| Stand-alone Computing Device | 29859 |

| Operation | Identifier | Counter Value |
|---|---|---|
| Modify | i | 29859 |
| Modify | ii | 29859 |
| | | |
| | | |
| | | |
| | | |
| | | |

261

| Synchronization Counter |
|---|
| 29860 |

266

| Device | Counter Value |
|---|---|
| Smartphone | 29858 |
| Stand-alone Computing Device | 29860 |

| Operation | Identifier | Counter Value |
|---|---|---|
| ~~Modify~~ | ~~i~~ | ~~29859~~ |
| ~~Modify~~ | ~~ii~~ | ~~29859~~ |
| | | |
| | | |
| | | |
| | | |
| | | |

261

| Synchronization Counter |
|---|
| 29861 |

266

| Device | Counter Value |
|---|---|
| Smartphone | 29861 |
| Stand-alone Computing Device | 29860 |

MULTI-WAY, PEER-TO-PEER SYNCHRONIZATION

TECHNICAL FIELD

The disclosed implementations relate generally to synchronizing information between various devices.

BACKGROUND

People use various devices to manage different kinds of information. For example, a person may use a desktop computer at his or her office to send and receive emails, manage a calendar, maintain personal and business contacts, and process various electronic documents and files. The person may also use a laptop computer while traveling to manage the same kinds of information. The person may also carry a personal digital assistant (PDA) to maintain a portable calendar. The person may also carry a cell phone or a smartphone to send and receive cellular calls. In some cases, the cell phone or smartphone includes PDA functionality and also provides access to office emails, calendar items and contact information. In such cases, the person may also use with the cell phone or smartphone an accessory I/O device that has a larger screen and keypad to more efficiently input data into or display data from the cell phone or smartphone.

To be most useful, each of the information-managing devices a person employs should provide access to the same version of information. To enable access to the same version of information from different devices, information can be synchronized between the different devices. For example, emails on a desktop computer can be synchronized with emails on a smartphone so that a person can read or respond to the same emails from either the desktop computer or the smartphone. As another example, calendar items on a PDA can be synchronized with calendar items on the desktop computer so that a user can determine his or her appointments and meetings by consulting either the desktop computer or the PDA.

Frequently, synchronization is managed with respect to a central repository. For example, the desktop computer at a person's office may connect to an enterprise server that maintains a central copy of emails and calendar items. To synchronize calendar items between the desktop computer and the PDA, the PDA may connect to the enterprise server. Similarly, to synchronize emails between the desktop computer and a smartphone, the smartphone may connect to the enterprise server. In such implementations, synchronization may only be possible when the central repository is accessible to the device whose data is being synchronized.

SUMMARY

In some implementations, a method of synchronizing data elements between devices includes directly receiving at a first device, from only one of multiple peer devices with which the first device is configured to synchronize, a remote data identifier and a corresponding change instruction; determining whether the remote data identifier is included in a mapping in the first device; and if the remote identifier is included in the mapping, applying the corresponding change instruction to a data element in the first device that is associated by the mapping to the remote data identifier; and if the remote identifier is not included in the mapping, creating a new data element to correspond to the remote data identifier.

In some implementations, a method of synchronizing data elements between devices includes receiving at a first device, from only one of multiple peer devices with which the first device is configured to synchronize, a request to synchronize data between the first device and the only one peer device; identifying data elements stored in the first device that have changed since a previous synchronization operation between the first device and the only one peer device; and transmitting, directly and solely to the only one peer device, for each of the identified data elements, a local data identifier and a corresponding change to be applied to a data element in the only one peer device that corresponds to the local data identifier.

Identifying the data elements can include determining whether a device table that tracks synchronization operations between the first device and other peer devices includes an entry corresponding to the only one peer device. Identifying the data elements can further include analyzing a change list that, for each change that has occurred since the previous synchronization operation, stores a data identifier that identifies the corresponding data element that has changed, a change operation that identifies the manner in which the corresponding data element has changed, and a counter value that provides a temporal reference for the change. Analyzing the change list can include comparing the counter value of each entry in the change list to a counter value associated with an entry in the device table that corresponds to the only one peer device.

In some implementations, a device includes a data store configured to store a plurality of digital data elements; a synchronization module configured to directly synchronize the plurality of data elements in the data store with corresponding data elements in any one of multiple other peer devices; and a computer-readable medium including program instructions. When executed, the program instructions can perform operations that include directly receiving, from only one of multiple peer devices with which the device is configured to synchronize, a remote data identifier and a corresponding change instruction; determining whether the remote data identifier is included in a mapping in the device; and if the remote identifier is included in the mapping, applying the corresponding change instruction to a data element in the data store that is associated by the mapping to the remote data identifier; and if the remote identifier is not included in the mapping, creating a new data element in the data store to correspond to the remote data identifier.

The details of one or more implementations are set forth in the accompanying drawings and the description below. Other features, objects, and advantages will be apparent from the description and drawings, and from the claims.

DESCRIPTION OF DRAWINGS

FIGS. 3A-3F are block diagrams showing additional details of a change list, synchronization counter and device table that can be used to track and control various aspects of a synchronization operation.

Like reference symbols in the various drawings indicate like elements.

DETAILED DESCRIPTION

Figure 1:
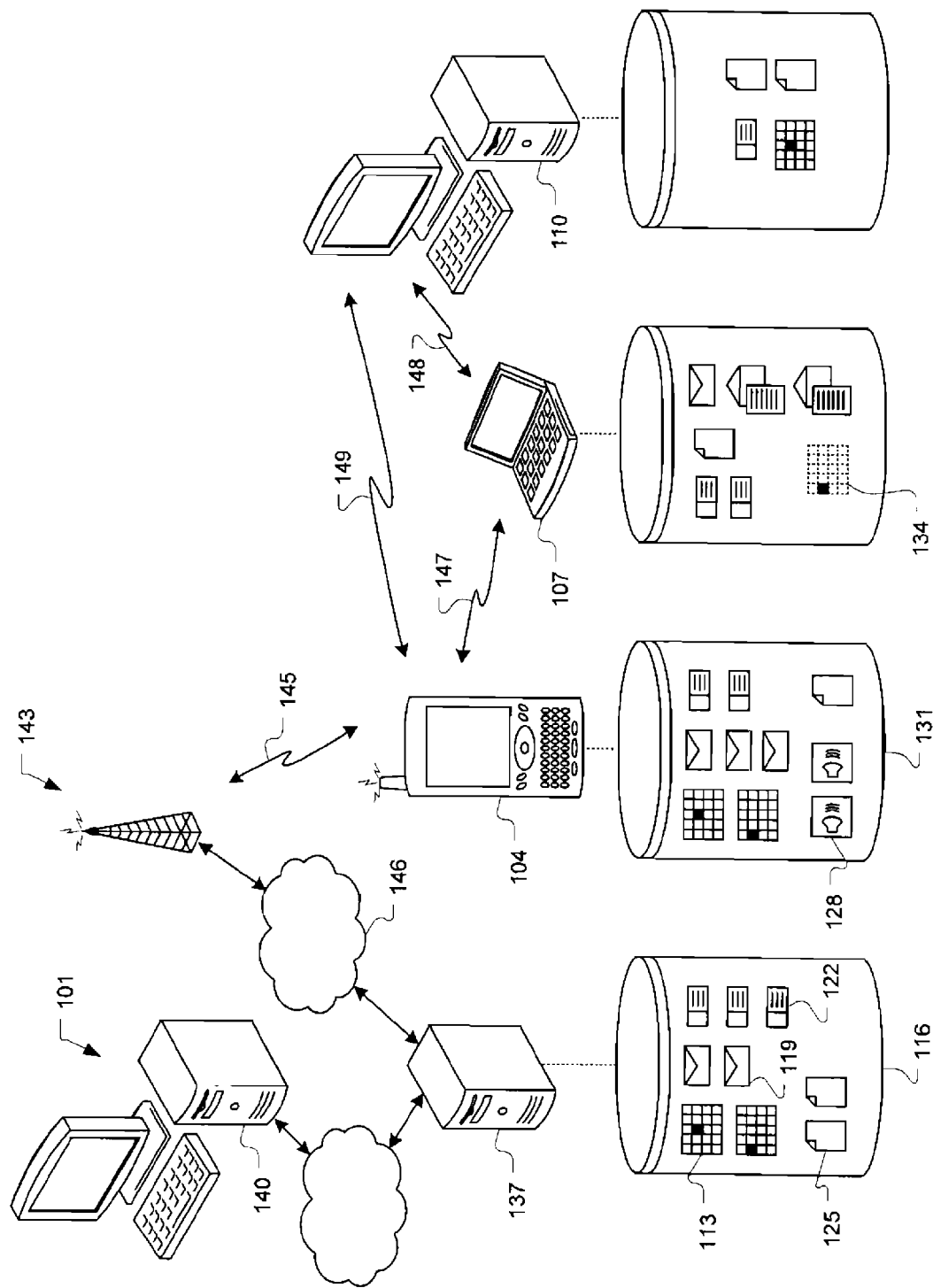
FIG. 1 is a block diagram illustrating example devices that can each process information that can be synchronized with information in other devices.

Several example devices that a user can employ to process various kinds of information are depicted in FIG. 1 and include an enterprise computing system 101, a smartphone 104, an accessory input/output (I/O) device 107, and a stand-alone computing device 110. In some implementations, each of the above-described electronic devices runs one or more applications (e.g., software programs) to allow the user to manage particular kinds of information (e.g., information embodied in specific data elements). Not all devices necessarily process all kinds of data elements. For example, the enterprise computer system 101 can be configured to process calendar data elements (e.g., including a calendar data element 113, depicted in a data store 116 associated with the enterprise computing system 101), email message data elements (e.g., including an email message data element 119), contact data elements (e.g., including a contact data element 122) and document data elements (e.g., including a document data element 125). As another example, the smartphone 104 and stand-alone computing device 110 can be configured to process many of the same data elements. In addition, the smartphone 104 can be configured to process voicemail data elements (e.g., including a voicemail data element 128, depicted in a data store 131 associated with the smartphone 104).

To enable a user to process the same underlying information (e.g., information embodied in specific data elements), the information can be synchronized between devices. Synchronizing data elements between two different devices can include, for example, initially creating data elements in a first device that correspond to data elements a second device. In particular, for example, with reference to a first device having no contact data elements and a second device having three contact data elements, synchronization can include creating three contact data elements in the first device that correspond to the three contact data elements in the second device. Correspondence can include storing the same underlying information, even if the exact format in which the data is stored is different between the devices. For example, contact data elements in the first device (e.g., an enterprise computing system) could be stored as Microsoft Outlook Contacts and the corresponding data elements in the second device (e.g., a Palm® Treo™) could be stored as Palm Desktop address records or business card records. In this example, even though the exact format of the data elements is different in each device, the same underlying data (e.g., name, address and contact information for different people or organizations) can be the same.

Subsequent to initially creating data elements in the first device that correspond to data elements in the second device, synchronization of two data elements can include updating one or both of the data elements to reflect changes in either of the data elements since an initial or previous synchronization. For example, if contact data elements are synchronized between an enterprise computing system and a smartphone, and one of the contacts is subsequently modified in the enterprise computing system, synchronizing the contacts can include applying the same modification to the corresponding contact in the smartphone.

In some implementations, a synchronization operation is requested by one of two devices being synchronized, and the other device responds to the synchronization request. Synchronization operations can be initiated in response to different triggers. For example, in some implementations, a device can initiate a synchronization operation with another device as soon as a connection is available between the devices (e.g., a wired or wireless connection, as described in greater detail below). In some implementations, a first device can initiate a synchronization operation with a second device as soon as data is changed in the first device. In such implementations, if a connection does not exist between the devices, changes to data in the first device can be logged and queued for synchronization at a time when a connection between the devices does exist.

In some implementations, two different kinds of synchronization operations can be performed—an exhaustive synchronization operation, and an incremental synchronization operation. For example, an exhaustive synchronization can be performed when a first device that stores several data elements is synchronized with a second device that does not currently store any data elements. As another example, an exhaustive synchronization can be performed when data elements in one of the two devices being synchronized have been corrupted. In some implementations, an exhaustive synchronization operation can include copying all data elements in the first device to the second device. Subsequent to an initial exhaustive synchronization operation, an incremental synchronization can be used to update previously synchronized devices. That is, in some implementations, only differential data is sent—that is, data that captures changes to data elements relative to state of the corresponding data stores following a previous synchronization operation. Additional example details are now provided for various devices whose information can be synchronized.

For purposes of the examples that follow, the enterprise computing system 101 can include an enterprise server 137 and one or more user terminals (depicted by a user terminal 140). Various application programs that the user can employ to process different data elements can be provided by either the enterprise server 137, or the user terminal 140, or a combination of the two devices. For example, a user can employ an email client running on the enterprise computing system 101 to receive email messages and compose replies and new email messages. As another example, a user can employ a file processing application to create, view and edit electronic files on the enterprise computing system 101.

In some implementations, the email messages or electronic files are stored on the enterprise server 137 (e.g., in a storage location depicted by the data store 116), and the user interacts with the email messages or electronic files through the terminal 140. In other implementations, email messages and electronic files are stored on the terminal 140 itself. In some implementations, email messages, electronic files, and other data elements stored in the enterprise computing system 101 are available from a cellular network 143, via an adapter network 146.

The smartphone 104 (e.g., a Palm® Treo™) can be configured to send and receive emails; receive and place telephone calls; create, view and edit electronic files; and access voicemails. Cellular service can be provided by the cellular network 143, which, as indicated above, can also provide access to emails, electronic files and other data elements stored on the enterprise computing system 101.

The accessory I/O device 107 can be configured to display output and receive input associated with the smartphone 104. In some implementations, the accessory I/O device 107 provides a larger screen and larger keyboard through which the user can more easily view and enter information on the smartphone 104. In some implementations, the accessory I/O device 107 includes similar resources as a laptop computer (e.g., a microprocessor, memory, persistent storage and various input/output and communication facilities) but the accessory I/O device 107 may be smaller and more portable than a laptop computer. In some implementations, the accessory I/O device 107 does not have cellular communication resources, and thus cannot receive data elements that are stored on the enterprise computing system 101 except through another device (e.g., the smartphone 104).

In some implementations, the stand-alone computing device 110 does not have facilities to directly connect to the enterprise computing system 101 but is otherwise a fully functional computer device having a microprocessor, memory, persistent storage and various input and output capabilities.

The above-described electronic devices and features of the devices are merely exemplary. The reader will appreciate that other variations in the kinds of data that can be processed and the types of devices that process the data are contemplated. For example, digital photos, videos, music files, bookmarks, preferences, and various other kinds of data can be synchronized between devices. Moreover, even if a device is not configured to create or manipulate a particular kind of data, the device may be configured to store that kind of information and pass it to other peer devices. For example, as depicted in one implementation in FIG. 1, the accessory I/O device 107 is not configured to process calendar data elements (as represented by a dashed-line calendar data element 134), but the accessory I/O device 107 may nevertheless be configured to store and synchronize calendar data elements with other peer devices. In particular, in such implementations, the accessory I/O device 107 can be configured to receive calendar data elements from the smartphone 104 or the stand-alone computing device 110 and transmit received calendar data elements to the other device during a synchronization operation—even though the accessory I/O device 107 may not be configured to create or modify calendar data elements.

An example scenario further illustrates how a user (e.g., a business executive) can employ the various above-described devices to process information. In this example scenario, the business executive works from her employer's office in the early morning; travels to the airport later in the morning to catch a flight to a customer site; flies to the customer site; and works with the customer in the afternoon to solve a problem. Throughout the day, the business executive processes various kinds of information.

From the enterprise terminal 140, the business executive sends and receives emails; accepts appointments and meeting requests; and creates, views and edits various documents and electronic files. At the airport, just before boarding her aircraft, the business executive uses her smartphone 104 to retrieve her emails from the enterprise computing system 101 (e.g., via a synchronization path 145, through the cellular network 143), then synchronizes the retrieved emails and several documents stored on her smartphone 104 with her accessory I/O device 107 (e.g., via a synchronization path 147), before turning off her smartphone 104. From the aircraft, using the accessory I/O device 107, the business executive reads several unread email messages, drafts several replies and new emails, and makes edits to some of the documents stored on the accessory I/O device 107. When the aircraft lands, the business executive powers on her smartphone 104 and synchronizes emails between the smartphone 104 and the accessory I/O device 107 (e.g., via the synchronization path 147), allowing the draft replies and new emails to be sent from the smartphone 104. Later in the day, at the customer site, the business executive transfers documents from the accessory I/O device 107 to the stand-alone computer device 110 (e.g., via a synchronization path 148), from which she edits several of the documents. At the end of the customer visit, the business executive transfers the edited documents from the stand-alone computer device 110 to the accessory I/O device 107 (e.g., via the synchronization path 148), then later to the smartphone 104 (e.g., via the synchronization path 147), from which they are transferred back to the business executive's enterprise computing system 101 (e.g., via the synchronization path 145).

Peer-to-peer synchronization can be advantageous in some implementations, such as the scenario described above, since it can allow data to be passed from one device to another device, even if one or both of the devices between which data is being transferred do not have access to a centralized server (e.g., the enterprise server 137). That is, in various implementations, data can be transferred from any peer device to any other peer device.

Peer-to-peer synchronization can include a mode of information transfer by which data elements are transferred between similarly provisioned peer node devices. That is, in some implementations, any peer node device can initiate a transfer of data with any other peer node device; in such implementations, each peer node device can both transmit synchronization requests to other peer node devices, and receive and service synchronization requests from other devices.

As depicted in one implementation in FIG. 1, the smartphone 104, the accessory I/O device 107 and the stand-alone computing device 110 are all peer devices. In particular, each of the three devices can initiate a synchronization operation with either of the other two devices, and each of the three devices can respond to requests for a synchronization operation from either of the other two devices. As depicted, data can be transmitted directly from one device to another device (e.g., without having to pass through an intermediate device and without coordination with a server device). In particular, for example, data can be directly exchanged between the smartphone 104 and accessory I/O device 107 via path 147; data can be directly exchanged between the smartphone 104 and the stand-alone computing device via path 149; and data can be exchanged directly between the accessory I/O device 107 and the stand-alone computing device 110 via path 148. Each path 147, 148 and 149 can represent a communication interface, such as, for example, a Bluetooth interface, a physical cable, removable storage media, etc., as is described in greater detail below.

In some implementations, a peer-to-peer model of data transfer is distinguished from a client-server model, in which a single server or small number of servers receives requests for data from various client devices. Put another way, some peer devices are configured to function as both servers and clients, depending on their context, rather than being configured to function only as a dedicated server or a dedicated client, as is the case with some client-server devices. A client-server data transfer model is sometimes described as a hub-and-spoke model, in which the server is the hub and each client device is a spoke connected to the server. In this model, each client can be configured to exchange data with the server through its spoke connection to the server, and data exchanges between two clients can be routed through the server hub, rather than performed directly between the clients.

In some client-server implementations, the server tracks the state of data at each of the client devices and is directly involved in each synchronization operation. Thus, in some implementations, synchronization of data between two client devices involves synchronization of one of the two client devices with the server, followed by synchronization of the other client device with the server. In contrast, in some implementations of peer-to-peer synchronization, data is compared and synchronized between only two devices at any given time. In such implementations, no single device may track state of all data on all of the other devices. Rather, data may be propagated and synchronized from one device to another in a peer-to-peer manner.

The reader will appreciate that peer-to-peer synchronization can be provided by a network of devices, some of which are also configured as clients or servers. For example, as described above with reference to FIG. 1, the smartphone 104 can be a peer with the accessory I/O device 107 and the stand-alone computing system 110; however, the smartphone 104 can also be configured to function as a client relative to the enterprise computing system 101. In some implementations, data can be synchronized among the peer devices, but certain data processing steps are handled by particular peer devices. In particular, for example, in some implementations, email data is processed by the peer devices 104, 107 and 110, but sent and received only from the smartphone 104.

Figure 2A:
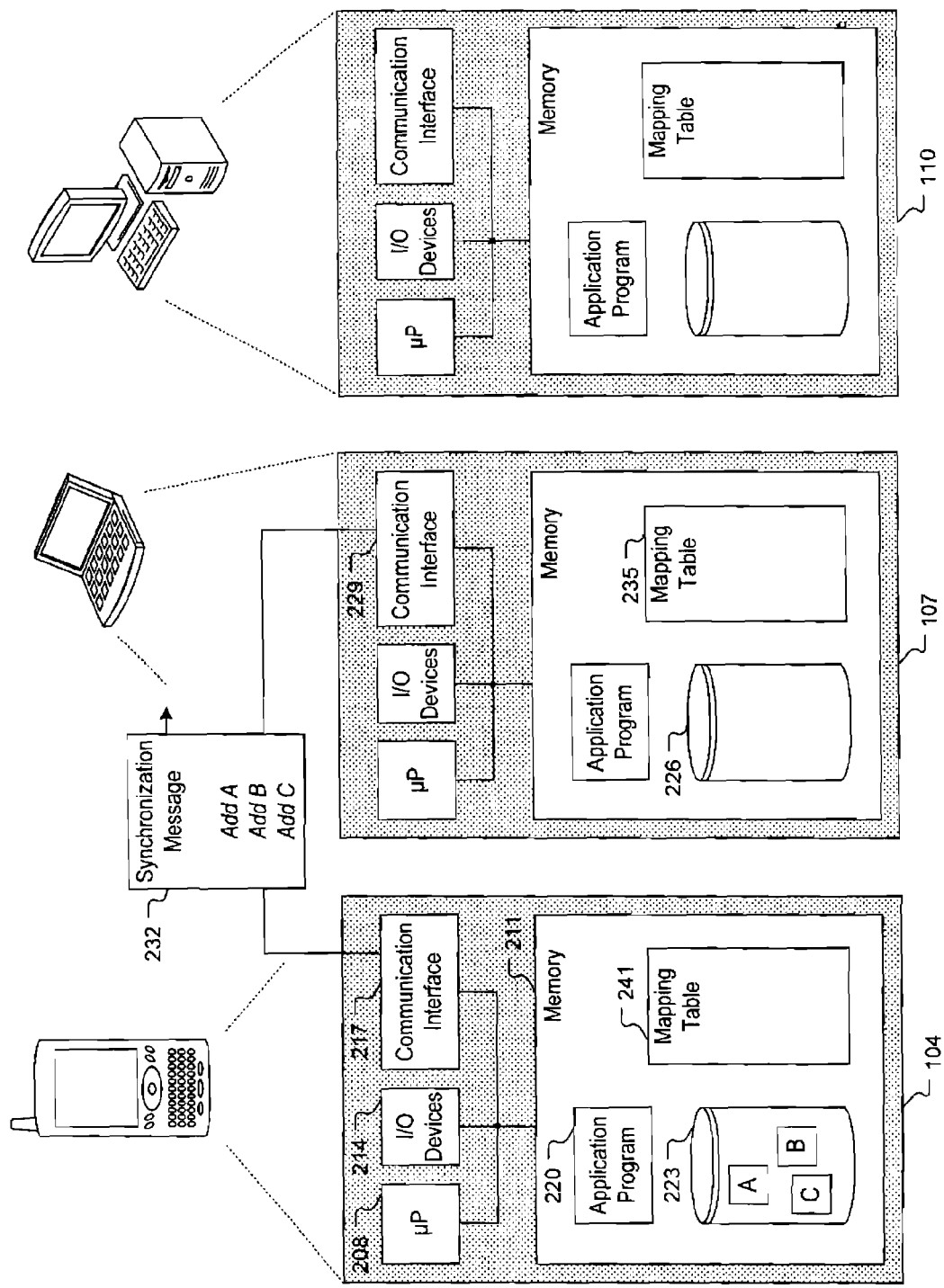
FIGS. 2A-2E are block diagrams showing additional details of three example devices and illustrating example aspects of peer-to-peer synchronization.

FIGS. 2A-2E are block diagrams showing additional details of three of the devices shown in FIG. 1. FIGS. 2A-2E illustrate how, in some implementations, information can be synchronized between multiple devices in a peer-to-peer manner. For purposes of illustration, the three devices in FIGS. 2A-2E are shown as the smartphone 104, the accessory I/O device 107 and the stand-alone computing device 110. The reader will appreciate, however, that these devices are merely representative of any kind of peer device whose information can be synchronized with corresponding information in one or more other peer devices. As shown in FIG. 2A, each of the devices 104, 107 and 110 includes a microprocessor, memory, I/O devices and a communication interface, of which the microprocessor 208, the memory 211, the I/O devices 214, and the communication interface 217 are representative.

The microprocessor 208 can execute various programming instructions stored in the memory 211 to perform tasks such as, for example, receiving input from an input device 214 or from the communication interface 217, providing output to an output device 214 or the communication interface 217, or manipulating data stored in memory 211. Suitable processors for the execution of a program of instructions include, by way of example, both general and special purpose microprocessors, and the sole processor or one of multiple processors of any kind of computer.

The memory 211 is shown as a single block, but the memory can include multiple kinds of memory (e.g., RAM, ROM, persistent memory, volatile memory, physical memory, virtual memory, etc.) and can be provided by multiple different devices (e.g., registers within the microprocessor 208, cache chips, RAM chips, magnetic hard drives, optical drives, standalone Flash devices, etc.).

Particular programming instructions stored in the memory 211 can make up application programs, such as the application program 220. Individual application programs can be configured to enable a user to manipulate certain kinds of data, such as email messages, calendar items, electronic files, etc. Moreover, individual application programs can be configured to synchronize data with corresponding applications running on other devices.

In some implementations, as depicted in FIG. 2, actual data elements (e.g., individual email messages, calendar items, etc.) can be stored separately from the programming code that makes up the application program(s) used to process the data elements. In particular, FIG. 2A depicts a data store 223 that can store individual data elements. For purposes of example, the data store 223 is shown to store elements A, B and C, which could represent any kind of data (e.g., email data elements, calendar data elements, etc.). In some implementations, a data store maintains a single kind of data element, such as email messages or calendar items. In other implementations, a single data store can maintain multiple different kinds of data elements.

Only one application program 220 is shown, but the reader will appreciate that multiple application programs can be included in the memory 211. In some implementations, as depicted in FIG. 2A, a single application both processes data elements and provides functionality to synchronize the data elements with data elements in other devices (e.g., the device 104). In other implementations, many separate application programs perform various discrete functions, such as processing data elements or synchronization the data elements with data elements in other devices.

I/O devices 214 can include a keyboard, mouse or other pointing device, voice-input processor, position sensor, display screen, indicator, audio output device, etc., to receive input or provide output to a user. In the implementation that is depicted in FIG. 2A, the communication interface 217 can be a special form of I/O device that is configured to transmit and receive information in a digital format with a corresponding communication interface (e.g., a communication interface 229) of another device (e.g., device 107).

In some implementations, the communication interface 217 can transmit and receive data in one or more of many different formats, using different media and different data protocols. In some implementations, the communication interface 217 includes, for example, a wired interface, such as a Universal Serial Bus (USB) interface, an IEEE (Institute of Electrical and Electronics Engineers) 1394 "FireWire" or "i.Link" interface, a serial (e.g., RS-232) interface, a fiber interface (e.g., an OC-3, OC-48 or Fibre Channel connection), or a T1 or E1 telecommunications carrier interface. These wired interfaces are merely exemplary, and other wired interfaces are contemplated. In some implementations, the communication interface 217 includes, for example, a wireless interface, such as an IEEE 802.11 Wireless LAN (Local Area Network) interface, an IEEE 802.15 Wireless PAN (Personal Area Network) interface (e.g., a Bluetooth interface), an IEEE 802.16 broadband wireless access ("WiMAX") interface, or an infrared interface characterized by any number of standards provided by the Infrared Data Association (IrDA). These wireless interfaces are merely exemplary, and other wireless interfaces are contemplated.

Through the communication interfaces 217 and 229, data elements can be synchronized between the two devices 104 and 107. In some implementations, synchronizing data elements in the two devices 107 and 110 can include modifying data elements in one or both of the devices (including creating new data elements or deleting existing data elements) such that after the modification or synchronization operation, the data elements in each device store the same underlying information.

Figure 2B:
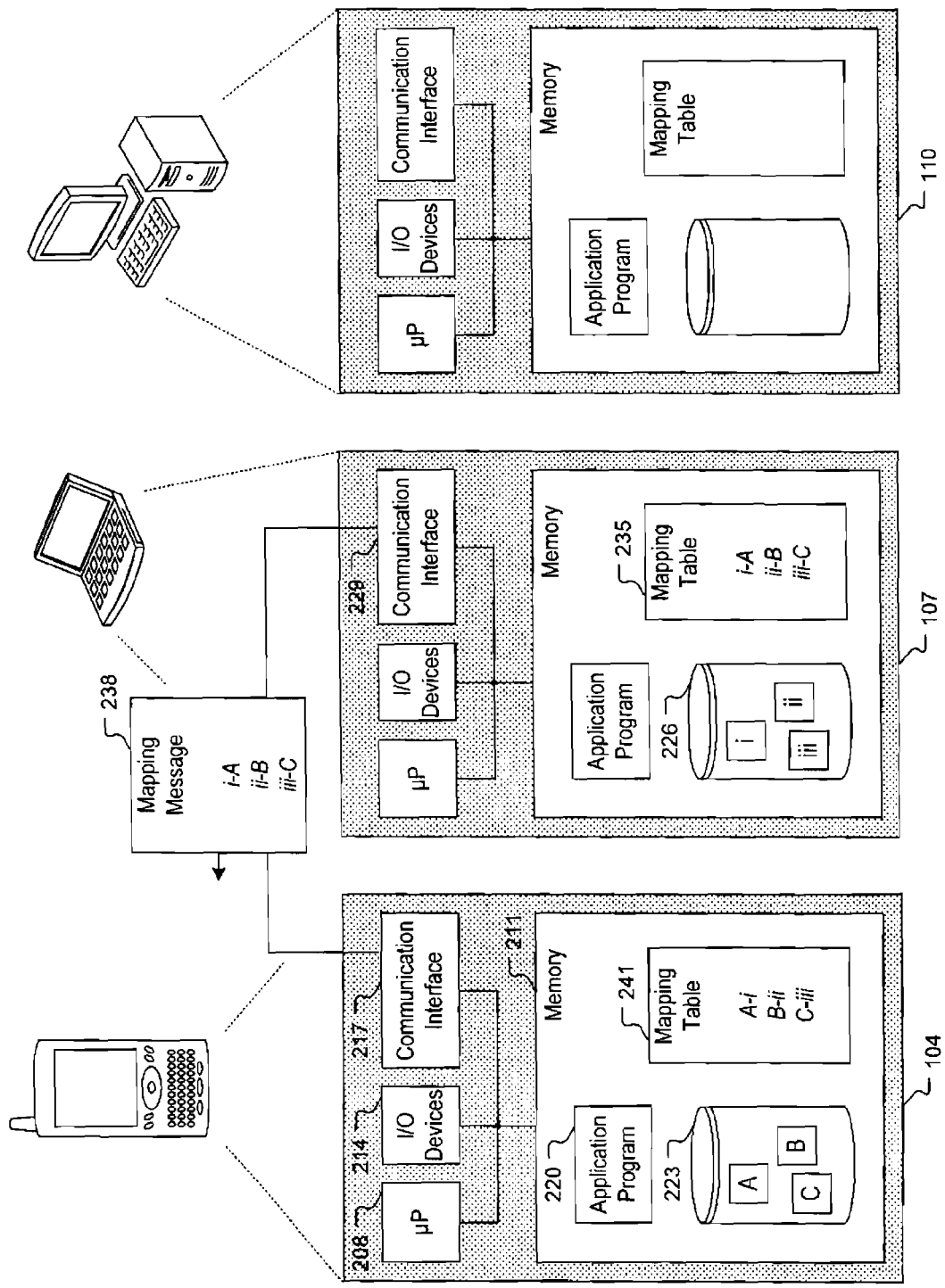
Figure 2C:
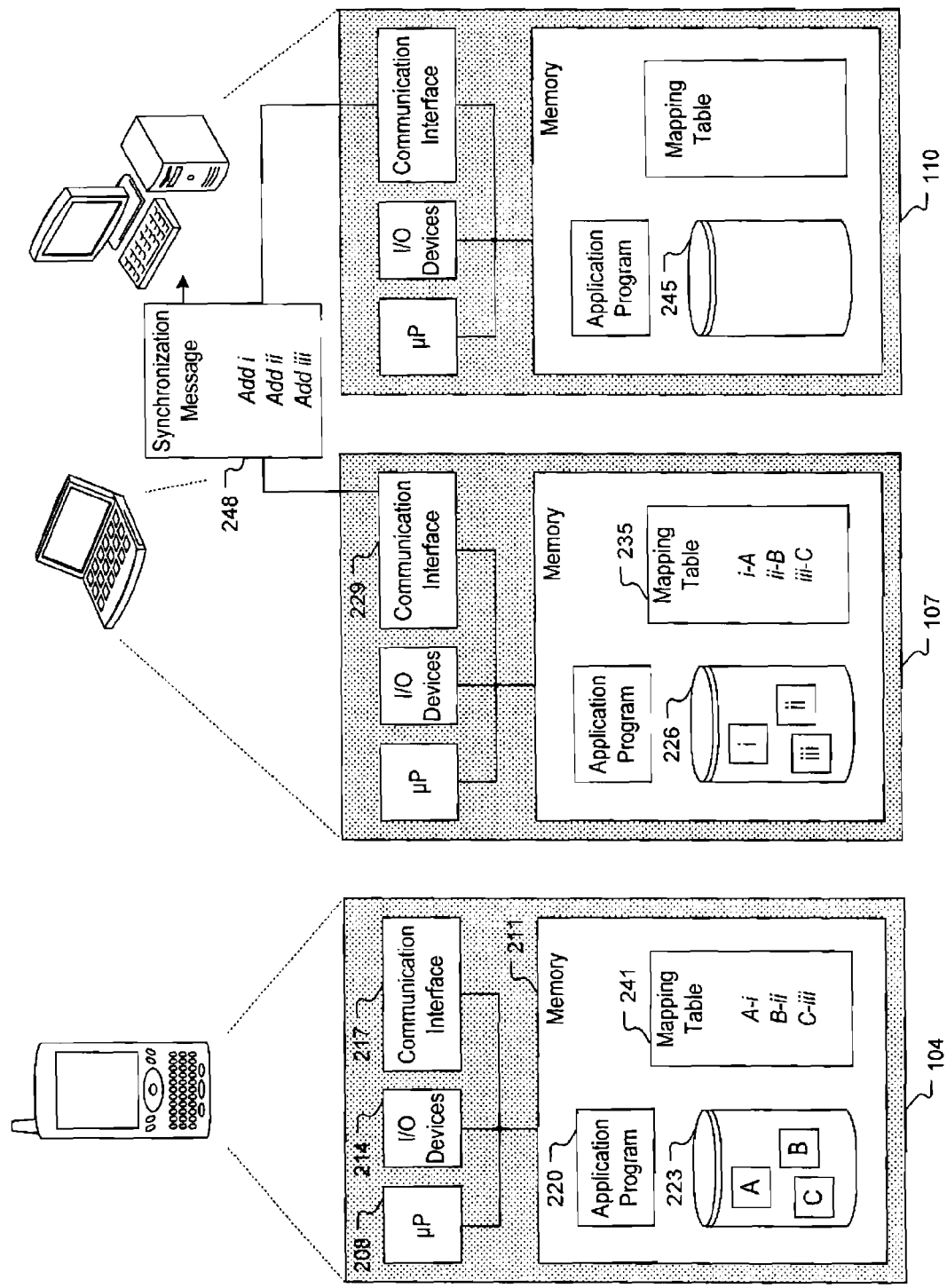
Figure 2D:
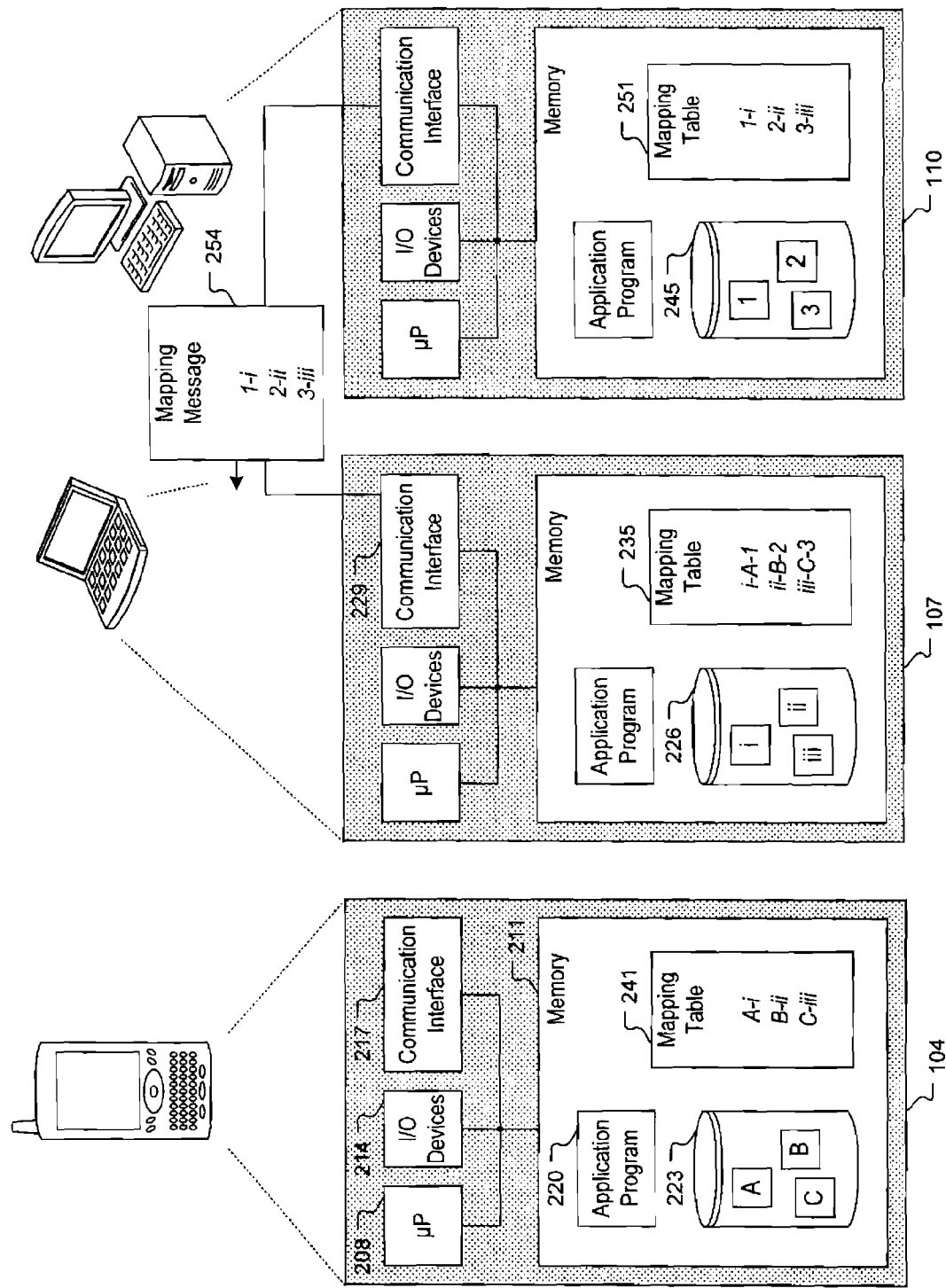

In some implementations, a synchronization operation is performed between two devices, and the synchronization is initiated by one of the two devices between which data is to be synchronized. In such implementations, more than one synchronization operation can be performed to synchronize information in additional devices. For example, FIGS. 2A and 2B illustrate an example first synchronization operation between the smartphone 104 and the accessory I/O device 107. FIGS. 2C and 2D illustrate an example second synchronization operation between the accessory I/O device 107 and the stand-alone computing device 110. In other implementations (not depicted in the figures), synchronization of data in more than two devices can be performed simultaneously.

A synchronization operation can be performed to synchronize data between two devices that have not been previously synchronized. In some implementations, one of the devices is empty (e.g., initially stores no data elements that are to be synchronized with data elements in the other device). In other implementations, both devices store data elements that have no initial correspondence with data elements in the other device. Whatever the state is of the data in the two devices at the beginning of the synchronization, the data in each device matches (e.g., stores the same underlying information) at the end of the synchronization process, in some implementations. Example processes by which data in two devices can be made to match (e.g., be synchronized) is described with continued reference to FIG. 2A.

As depicted in FIG. 2A, the smartphone 104 includes a data store 223, which stores data elements A, B and C. The accessory I/O device 107 is depicted as also having a data store 226 that initially stores no data elements. To synchronize data between the two devices, the first device 104 can identify its data elements that should be included in the synchronization operation. In this example, since the smartphone 104 and the accessory I/O device 107 have not been previously synchronized, all data elements in the smartphone 104 (A, B and C) are identified and sent to the accessory I/O device 107. In other situations, only a subset of data elements stored in the first device (e.g., the smartphone 104) are identified and transmitted to the second device (e.g., the accessory I/O device 107) during the synchronization operation. For example, if the devices have previously been synchronized, only those data elements that have changed in the first device may be identified and sent to the second device during a current synchronization operation. As another example, if the devices are configured to process different types of data elements (e.g., email data elements, calendar data elements, contact data elements, voice mail data elements, etc.), only those data elements that are processed by both devices may be synchronized.

In some implementations, the actual changes to data elements in the first device are transmitted to the second device in the form of change instructions in a synchronization message 232. Change instructions can include, for example, instructions to add a new data element, delete a data element or modify an existing data element. In the example depicted in FIG. 2A, the synchronization message 232 can include instructions to add data elements to the data store 226 to correspond to the data elements A, B and C in the data store 223. An example in which a different synchronization message includes instructions to modify a data element is depicted in and described with reference to FIG. 2E.

In some implementations, each data element in each device has an identifier by which the data element can be referenced. Change instructions that are included in a synchronization message can include the data identifier of the element being changed, in order, for example, to uniquely specify the intended change. For example, in the implementation shown in FIG. 2A, A, B and C are data identifiers corresponding to the data elements in the data store 223. In the case of an add change instruction, actual content can be provided along with the instruction (e.g., add A [content of A], where [content of A] includes the underlying information that is to be added to a newly created data element in a corresponding peer device).

In some implementations, each data store in each device maintains its own version of data identifiers for its data elements. To facilitate synchronization with data elements in other devices, a specific peer device can maintain a mapping table that tracks relationships between data elements in the specific peer device itself and corresponding data elements in other peer devices with which this specific peer device synchronizes. A table is used as an example, but the reader will appreciate that any other mechanism capable of tracking correspondence between data elements can be employed (e.g., a mapping function, a look-up table, a relational database, etc.). In some implementations (e.g., some client-server implementations), each data element has a global identifier (e.g., a system-wide, unique identifier) in addition to a local identifier, and the mapping correlates the local identifier to the global identifier to allow data elements to be synchronized using their global identifiers. In such implementations, a server device may maintain mappings of global-local identifiers for each client device with which the server synchronizes. In some other implementations (e.g., implementations in which data is synchronized in a peer-to-peer manner), no global identifier may be maintained by the peer devices; rather a specific peer device may maintain a mapping that correlates local identifiers of data elements within the specification peer device itself to local identifiers of data elements in other peer devices with which the specific peer device synchronizes. An example of this latter method of mapping local identifiers to other local identifiers is further described with reference to FIG. 2B.

FIG. 2B illustrates an example application of the synchronization message 232 to the accessory I/O device 107. In particular, as depicted in one implementation, data elements i, ii and iii have been added to the data store 226 (e.g., in response to change instructions included in the synchronization message 232). In this example, i, ii and iii are local identifiers maintained by the accessory I/O device 107, and A, B and C are local identifiers maintained by the smartphone 104.

In order to facilitate future synchronization operations, each peer device 104 and 107 can maintain a mapping table that correlates the data elements in the two devices. For example, as depicted in one implementation in FIG. 2B, the accessory I/O device 107 can maintain a mapping table 235 that correlates data elements i and A, data elements ii and B and data elements iii and C. The mapping table can then be used in subsequent synchronization operations to identify specific data elements to which changes should be applied. For example, upon receipt of a subsequent synchronization message from the smartphone 104 including the change instruction "modify B," the accessory I/O device 107 can employ the mapping table 235 to determine that element B in the smartphone 104 corresponds to element ii in the accessory I/O device 107; accordingly, the change can be applied by the accessory I/O device 107 to the data element ii.

To enable the smartphone 104 to also maintain a mapping between its data elements and corresponding data elements in the accessory I/O device 107, the accessory I/O device 107 can send a mapping message 238 to the smartphone 104, after executing the changes included in the original synchronization message 232. The mapping message 238 can include the mapping information that the accessory I/O device 107 has stored in its mapping table 235. In response to receiving the mapping message 238, the smartphone 104 can update a mapping table 241 of its own. With the mapping table 241, the smartphone 104 can receive a subsequent synchronization message from the accessory I/O device 107 and appropriately update data elements in its data store 223. In particular, for example, the smartphone 104 could receive a "modify iii" change instruction from the accessory I/O device 107. Based on the mapping table 241, the smartphone 104 could determine that its data element C corresponds to data element iii in the accessory I/O device 107, and the smartphone 104 could accordingly update its element C in response to the subsequent synchronization message.

In some implementations, each peer device maintains its own mapping table, and each mapping table stores relationship information regarding data elements in other devices with which the peer device directly synchronizes. In implementations in which each peer device maintains its own mapping table, a peer device can synchronize its data elements with other peer devices using synchronization messages that specify the data elements by their local data identifiers only. Put differently, some implementations require no system-wide global identifiers for data elements. Moreover, no translation from a local identifier to a global identifier may be performed.

For purposes of illustration, the data identifiers described above are relatively short and simple, but the reader will appreciate that data identifiers can be longer and more complicated, and can encode more information. For example, in some implementations, data identifiers follow a hierarchical namespace organization. One example namespace organization is [device ID].[item type].[item ID], where [device ID] can identify the device that stores the data elements (e.g., the smartphone 104, the accessory I/O device 107, etc.); [item type] can specify a category of data element (e.g., email data elements, calendar data elements (more particularly, appointment data elements, task data elements, etc.), voicemail data elements, etc.); and [item ID] can uniquely a specific data element of the identified category and stored in the identified device. Thus, specific examples of data element identifiers could include "smartphone.email.A," "smartphone.contact.B" or "IODevice.rolodex.ii."

In some implementations, certain portions of a data identifier are consistent across devices, even when the device identifiers are local (possibly unique) to each device. For example, in some implementations, [item type] specifies a MIME type of the data element (Multipurpose Internet Mail Extension), such as "text/plain" or "application" or "multipart." As another example, the item type can specify an encoding format, such as XML (eXtensible Markup Language), WBXML (WAP (Wireless Application Protocol) binary XML), or some other format. In some implementations, namespace identifiers can be encoded in some manner. Thus, "IODevice.rolodex.ii." may be represented electronically as a number, such as 3895204, or as a series of hexadecimal digits, such as 3AB6.52C1.9801.

FIG. 2C depicts an additional peer-to-peer synchronization operation between the accessory I/O device 107 and the stand-alone computing device 110. In the example depicted in FIG. 2C, no previous synchronization operation has been performed to synchronize data elements in the accessory I/O device 107 and the stand-alone computing device 110. Moreover, as depicted in the example, the data store 245 initially has no data elements. Accordingly, in this example, synchronization of data elements between the accessory I/O device 107 and the stand-alone computing device 110 includes adding data elements to the stand-alone computing device 110 that correspond to data elements i, ii and iii in the accessory I/O device 107. To add such data elements, the accessory I/O device 107 can transmit a synchronization message 248 that includes a number of additional change instructions (e.g., "add"), data identifiers (e.g., the data identifiers i, ii and iii that are local to the accessory I/O device 107) and underlying content of the data elements to be added to the stand-alone computing device 110 (underlying content not shown).

As is depicted by FIG. 2D, the stand-alone computing device 110 can create corresponding data elements 1, 2 and 3, in response to receiving the synchronization message 248.

The stand-alone computing device 110 can also create a mapping table 251 to store relationships between data elements 1 and i, 2 and ii and 3 and iii. So that the accessory I/O device 107 can also track the relationships between its data elements i, ii and iii and the newly created data elements 1, 2 and 3 in the stand-alone computing device 110, the stand-alone computing device 110 can send a mapping message 254 with the relationships described above. In response to receiving the mapping message 254, the accessory I/O device 107 can update its mapping table 235 (as shown).

As depicted in one implementation in FIG. 2D, the mapping table 235 reflects previous synchronization operations between the accessory I/O device 107 and the smartphone 104, and accessory I/O device 107 and the stand-alone computing device 110. In some implementations, as shown, relationships between data elements in the accessory I/O device 107 and data elements in multiple other peer devices can be tracked in a single row of the mapping table 235. That is, for each new device with which the accessory I/O device 107 synchronizes, a new column can be added to the mapping table 235. In this manner, relationship information can be efficiently tracked by a device.

Figure 2E:
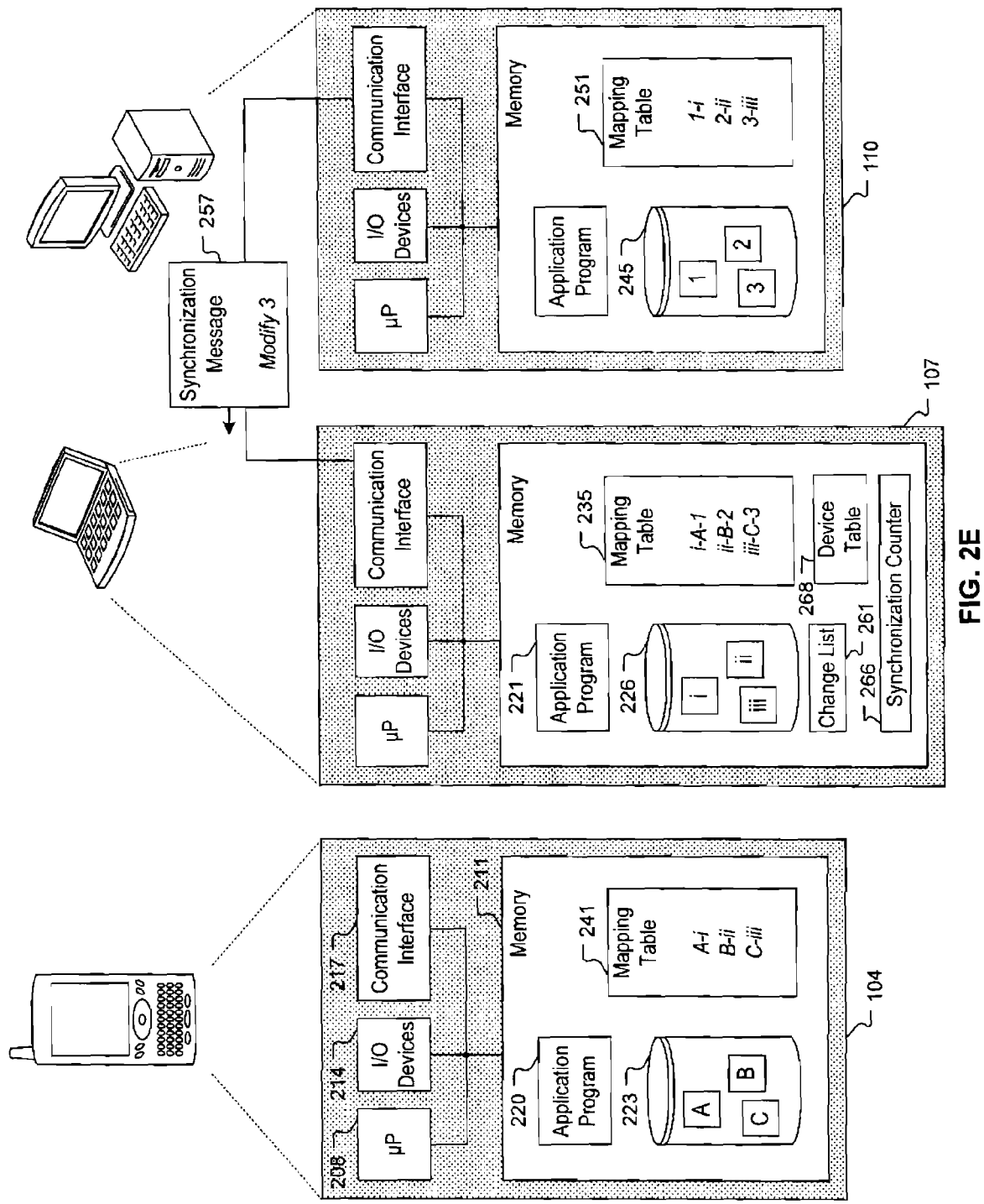

FIG. 2E depicts one implementation in which a data element that has been previously synchronized with a corresponding data element in one or more peer devices is changed. In particular, FIG. 2E depicts a change to data element 3 in the stand-alone computing device 110 that is subsequently applied to the accessory I/O device 107. In the synchronization operation depicted, the stand-alone computing device 110 sends a synchronization message 257 including the change instruction "Modify 3" to the accessory I/O device 107. Upon receipt of the synchronization message 257, the accessory I/O device 107 can query its mapping table 235 to determine that the change is to be applied to its data element iii. The accessory I/O device 107 can then apply the change. Because this change applies to a data element that already exists on both the accessory I/O device 107 and the stand-alone computing device 110, no mapping information need be communicated, in some implementations, between the devices 107 and 110. However, in some implementations, the accessory I/O device 107 acknowledges the synchronization message 257 to indicate that the corresponding change has been successfully applied.

In the example depicted in FIG. 2E and described above, only one of the two corresponding data elements (i.e., data element 3 and data element iii) in the two peer devices has changed. In some implementations, corresponding data elements that have been changed in both devices can be handled separately from changes that have been made to only one device's version of corresponding data elements. For example, in some implementations, one of the corresponding data elements in the two devices is selected (e.g., by an algorithm, or manually, by a user), and the changes in that version take precedence over and replace the changes in the other version. In other implementations, reconcilable changes in both of the corresponding data elements are applied to yield synchronized corresponding data elements that incorporate changes from both versions of the unsynchronized corresponding data elements.

After the example change depicted in FIG. 2E is applied to the accessory I/O device 107, the data elements in the accessory I/O device 107 and stand-alone computing device 110 will be synchronized, but the data elements in the smartphone 104 will not be synchronized with the accessory I/O device 107 and the stand-alone computing device 110. In particular, in this example, the data element C in the smartphone 104 will require the same change to be applied as was made in element 3, and applied to element iii. In some implementations, this change is applied to the smartphone 104 as soon as a connection exists between the smartphone 104 and the accessory I/O device 107. In some implementations, a change list 261, device table 268 and synchronization counter 266 can be employed by each peer device to track changes to data elements in other devices with which the peer device synchronizes, such as the change to data element C as described above. An example change list 261, device table 268 and synchronization counter 266 are shown in the accessory I/O device 107 in FIG. 2E and further illustrated in and described with reference to FIGS. 3A-3F.

Figure 3A:
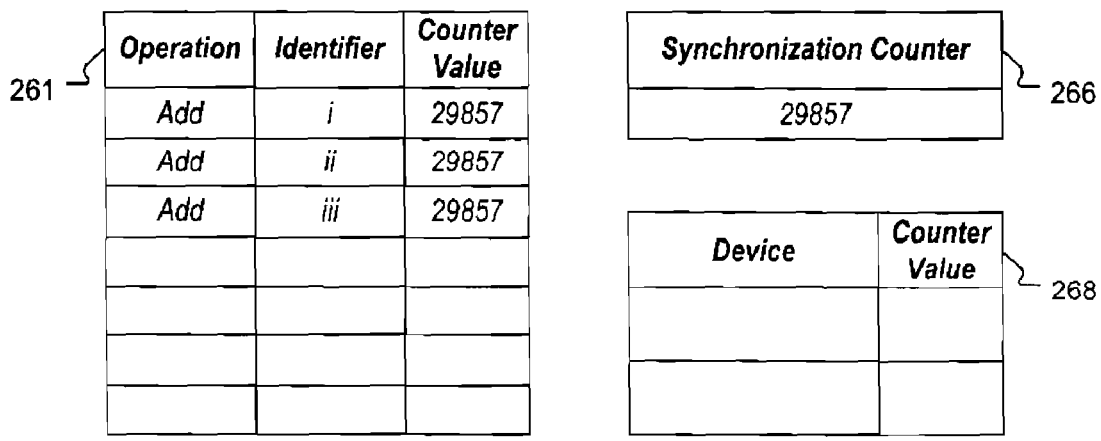

As depicted in FIG. 3A, a change list 261 can track changes to data elements in a device, for example, since a previous synchronization operation between data elements in the device and corresponding data elements in another device. In some implementations as shown, the change list 261 is a table with one row for each change entry, and three columns in each row to store a change operation (e.g., add, delete, modify, etc.), an identifier for a data element whose change is logged in the change list 261, and a counter value.

In some implementations, the counter value corresponds to a current value of the synchronization counter 266 when the change is applied. For example, the change list 261 that is shown in FIG. 3A corresponds to the scenario that is depicted in FIGS. 2A and 2B, in which the data elements i, ii, and iii are added to the data store 226. As depicted in FIG. 3A, the elements are added when the synchronization counter 266 has an exemplary value of 29857; accordingly, in this example, the counter value 29857 has been included in each row of the change list 261. In some implementations, the synchronization counter 266 is a counter that is incremented or decremented each time an event occurs, such as, for example, a successful synchronization operation.

The device table 268 can be employed in some implementations to track synchronization operations between the corresponding device (e.g., the accessory I/O device 107) and other devices (e.g., the smartphone 104 or the stand-alone computing device 110). Separate entries in the device table 268 can be included for each other device. Each entry can include a device identifier and a current value of the synchronization counter 266 as of the time of the most recent synchronization with the corresponding other device. As depicted in FIG. 3A and in FIGS. 2A and 2B, the accessory I/O device 107 has not previously synchronized with any other devices, so the device table 268 is initially empty.

Figure 3B:
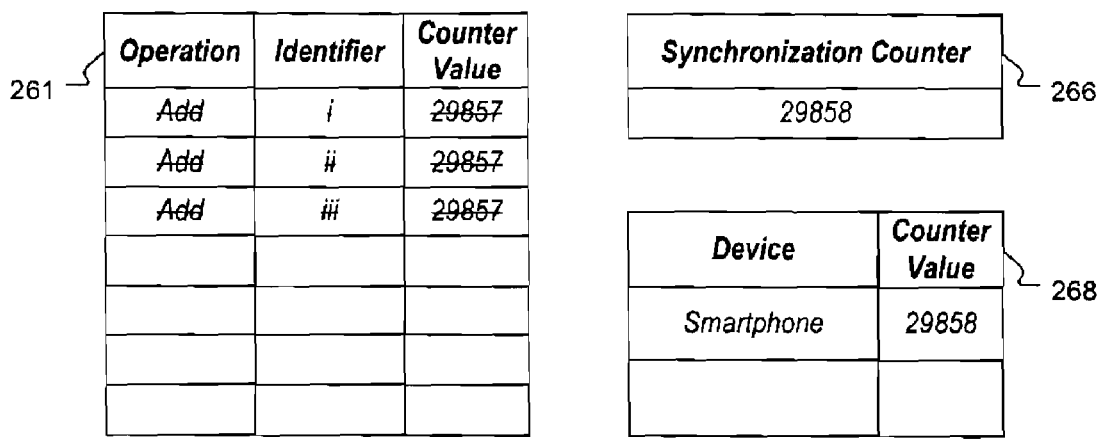

FIG. 3B depicts the completion of the synchronization operation described above with reference to FIG. 3A. In particular, in some implementations, the synchronization counter 266 can be incremented upon successful completion of a synchronization operation, as shown in FIG. 3B. Successful completion of the synchronization operation can be determined in different ways. For example, in some implementations, a synchronization operation is successfully completed when a mapping message is transmitted to a remote device after the corresponding local device receives and applies a synchronization message (e.g., as depicted in FIG. 2B). In some implementations, two synchronizing devices can exchange acknowledgement messages indicating that each respective device has completed all aspects of a synchronization operation.

In some implementations, the device table 268 is updated each time the synchronization counter 266 is incremented. In the example scenario described above, the accessory I/O device 107 initially has not synchronized with other devices. Once a synchronization operation has been completed with another device (e.g., the smartphone 104), an entry can be added to the device table 268 that includes an identifier for the other device and a post-incremented value of the synchronization counter, as shown in FIG. 3B.

In some implementations, each time the device table 268 is updated, the change list 261 is analyzed, and entries that are no longer needed are deleted. In some implementations, a change entry is deemed to not be needed any longer when it has been applied to all known peer deices (e.g., all peer devices for which corresponding entries are included in the device table 268). A determination can be made as to whether a change entry has been applied to all known peer devices by comparing the counter value associated with the change entry with the counter value(s) associated with entries in the device table 268. For example, in the case of a synchronization counter 266 that increments with each synchronization operation, any change entry in the change list 261 having a counter value that is less than all counter values in the device table 268 can be deleted. In FIG. 3B, all change entries have counter values that are less than the one counter value in the device table 268; accordingly, in this implementation, the change entries can be deleted (as depicted by strike-through text).

Figure 3C:
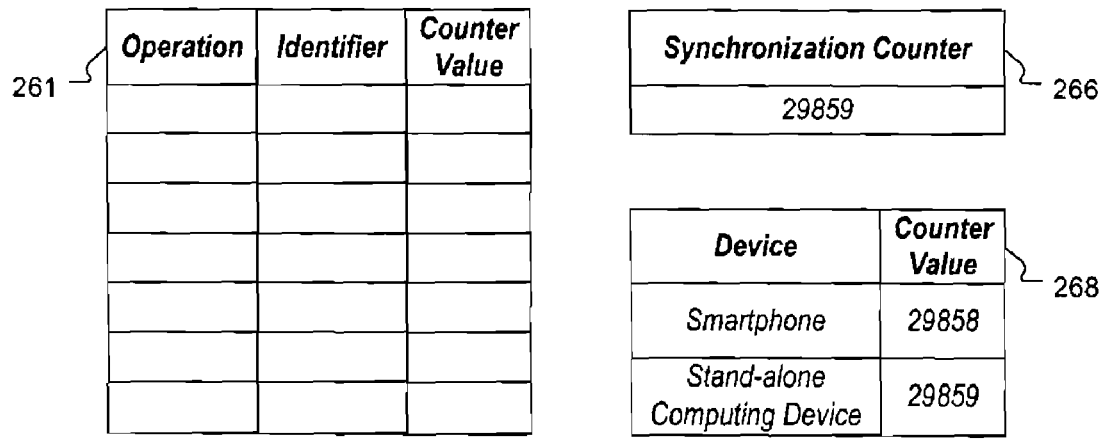

FIG. 3C depicts a synchronization operation with another device. In particular, FIG. 3C depicts the synchronization operation between the accessory I/O device 107 and the stand-alone computing device 110 that is illustrated in and described with reference to FIGS. 2C and 2D.

In some implementations, the device table 268 is queried at the beginning of a synchronization operation to determine whether the other device being synchronized has a corresponding entry in the device table 268. In some implementations, if an entry for the other device is included in the device table 268, then specific changes to be applied to the other device are obtained from the change list 261; if an entry for the other device is not included in the device table 268, then a previous synchronization operation with the other device is deemed to have not occurred, and all data elements can be provided to the other device. For example, with reference to FIGS. 3B and 2C, the accessory I/O device 107 and the stand-alone computing device 110 have not previously synchronized, so all data elements in the data store 226 of the accessory I/O device 107 (i.e., i, ii, and iii) can be provided to the stand-alone computing device 110. Once the synchronization operation is complete, the synchronization counter 266 can be again incremented, and an entry can be added to the device table 268 for the stand-alone computing device 110, as depicted in FIG. 3C.

FIG. 3D depicts an example scenario in which data elements are changed in the accessory I/O device 107 following initial synchronization operations between the accessory I/O device 107 and the smartphone 104 and between the accessory I/O device 107 and the stand-alone computing device 110. As depicted in one implementation, data elements i and ii have been modified in the data store 226 of the accessory I/O device 107, and these changes are logged in the change list 261, along with a current value of the synchronization counter 266.

In this example, the changes to data elements i and ii are first synchronized with data elements in the stand-alone computing device 110 (FIG. 3E) and then synchronized with the smartphone 104 (FIG. 3F). Upon initiation of a synchronization operation with the stand-alone computing device 110, the device table 268 can be queried to determine whether the accessory I/O device 107 has been previously synchronized with the stand-alone computing device 110 (e.g., to determine whether to obtain changes from the change list 261 or to create elements in the stand-alone computing device 110 that correspond to all data elements in the accessory I/O device 107). Since, in this example, the accessory I/O device 107 and stand-alone computing device 110 have previously synchronized, the change list 261 can be queried for changes to provide to the stand-alone computing device 110. In particular, changes can be identified whose counter values are equal to or greater than the counter value associated with the entry in the device table 268 for the stand-alone computing device 110. Both entries shown in FIG. 3D meet the example criterion, so both changes can be provided to the stand-alone computing device 110 (i.e., "modify i" and "modify ii").

Upon successful completion of this synchronization operation between the accessory I/O device 107 and the stand-alone computing device 110, the synchronization counter 266 can be incremented and the counter value associated with the stand-alone computing device entry in the device table 268 can be updated, as shown in FIG. 3E. As described above, the change list 261 can be analyzed at this point to determine whether any entries can be deleted. Since both entries in the change list 261 have counter values that are greater than the lowest counter value in the device table 268, the entries can be preserved.

Continuing with this example, the accessory I/O device 107 can be subsequently synchronized with the smartphone 104. Upon initiation of a synchronization operation with the smartphone 104, the device table 268 can be queried to determine if an entry exists that corresponds to the smartphone 104. Since, in this example, such an entry exists, a previous synchronization operation is deemed to have occurred between the accessory I/O device 107 and the stand-alone computing device 110, and the change list 261 can be processed for changes to be provided to the smartphone 104. In particular, change entries in the change list 261 can be identified whose counter values are greater than the counter value in the device table 268 that corresponds to the smartphone 104. In this example, since both entries have counter values that are greater than the counter value associated with the smartphone entry in the device table 268, both corresponding changes can be provided to the smartphone 104.

Upon successful completion of the synchronization operation between the smartphone 104 and the accessory I/O device 107, the synchronization counter 266 can again be updated, the device table 268 can also be updated, and the change list 261 can be processed as described above to determine whether entries can be deleted, as shown in FIG. 3F. In this example, since all entries in the change list 261 have, at this point, counter values that are less than the lowest counter value in the device table 268, all entries in the change list 261 can be deleted (as depicted by strike-through text).

The reader will appreciate that the above description is merely exemplary and that many variations can be made without departing from the spirit and scope of the disclosed implementations. For example, the synchronization counter 266 can be decremented rather than incremented, and comparison operations can be made in the opposite manner as described. The synchronization counter 266 can be advanced (e.g., incremented or decremented) with each change to a data element and each synchronization event (e.g., such that no two entries have the same counter value). Similar information can be stored in data structures other than tables. Additional information can be stored in one or more of the tables (e.g., an actual change, such as underlying data that is being added, modified or deleted). Additional tables can be employed. The tables illustrated and described above can be employed in both devices between which a synchronization operation is performed. For example, FIGS. 3A-3F depict one-half of a typical synchronization operation, in which changes to data elements in a local device are provided to a remote device. Another half of a typical synchronization operation can include receiving changes from the remote device and applying them to the local device. In some implementations, a synchronization operation is not complete until both halves of the synchronization operation have been successfully completed. In some implementations, the synchronization counter 266 is advanced at the beginning of a synchronization operation, such that changes to data elements during the synchronization operation are not applied until a subsequent synchronization operation. Other variations are contemplated.

Figure 4:
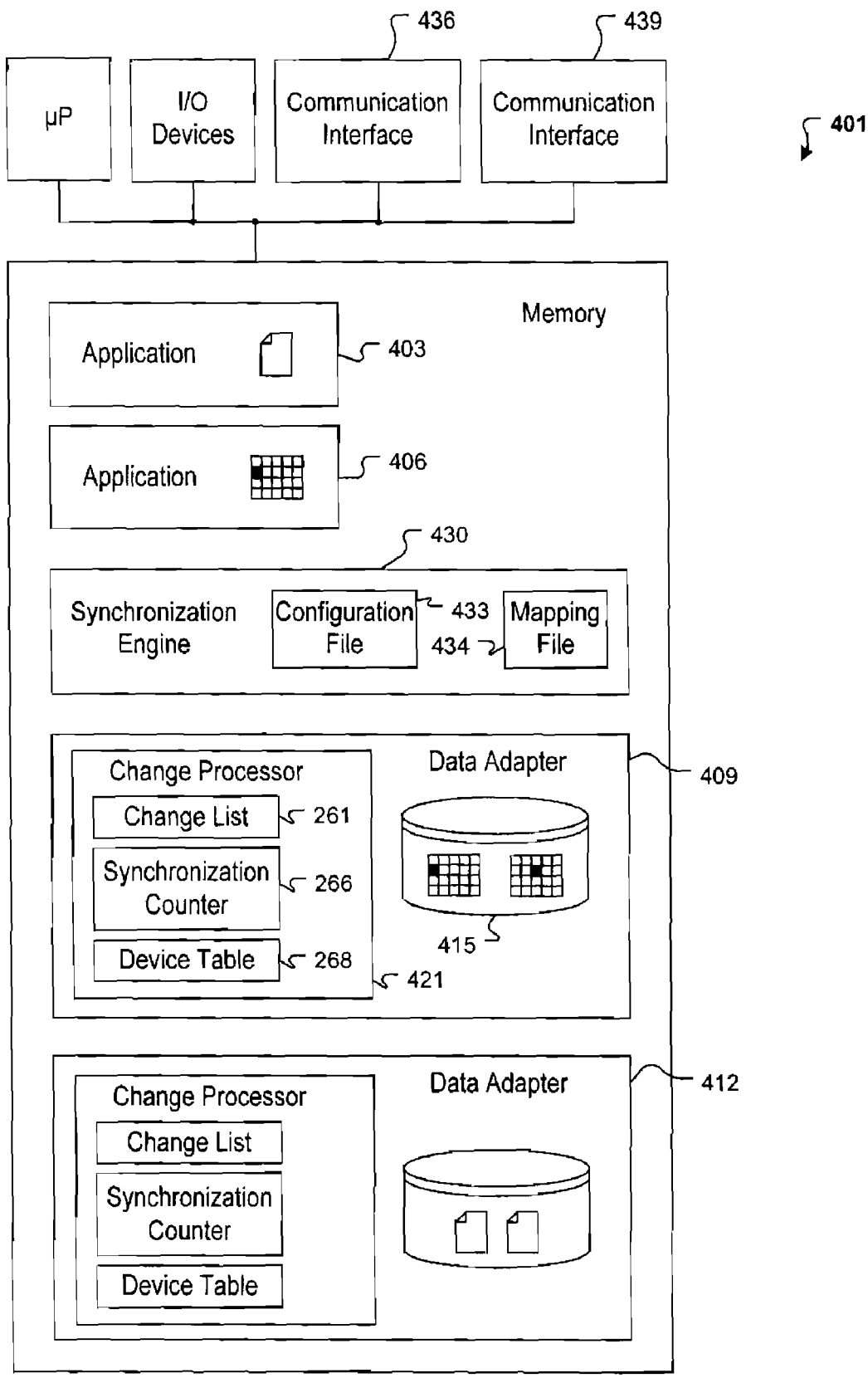
FIG. 4 is a block diagram showing additional details of an example peer device.

FIG. 4 is a block diagram showing additional details of another example device 401. In some implementations, the device 401 in FIG. 4 is representative of any of the peer devices (e.g., including the smartphone 104, the accessory I/O device 107, and the stand-alone computing device 110) that are shown in FIG. 1. As shown in one implementation in FIG. 4, the device 401 includes different applications 403 and 406, each of which can process a different kind of data element. For example, in one implementation, the application 403 processes document data elements, and the application 406 processes calendar data elements. In some implementations, each application or data element type has a corresponding data adapter module 412 and 409 that can provide an interface between the corresponding application and actual data elements that are processed by the applications 403 and 406.

As shown in one implementation in FIG. 4, the data adapter 409 can include a data store 415, and a change processor 421. In some implementations, the data store 415 maintains a particular kind of data element (e.g., email data elements, voicemail data elements, calendar data elements, etc.). The example data store 415 is depicted as being configured to store calendar data elements. The reader will appreciate that examples of a data store include a variety of storage mechanisms for data, such as files, databases and tables. In addition, the reader will appreciate that a device can include more or fewer than two data stores. In some implementations, the data adapter 409 employs the change processor to maintain the change list 261, synchronization counter 266 and device table 268, which are described above. In some implementations, a change processor in each data adapter can be employed in conjunction with a synchronization engine 430 to ensure that each change to data elements in the device 401 is applied to appropriate peer devices.

The synchronization engine 430 can be configured to generically handle synchronization of different kinds of data elements (e.g., data elements from multiple different data adapters, such as the data adapters 409 and 412). In some implementations, the synchronization engine 430 can track which types of data elements have been synchronized with various other devices. For example, with reference to FIG. 1, the synchronization engine 430 can track whether email messages in the accessory I/O device 107 have been synchronized with emails in the smartphone 104, or whether documents in the accessory I/O device 107 have been synchronized with documents in the stand-alone computing device 110.

In some implementations, the synchronization engine 430 employs a configuration file 433 to track which data elements have been synchronized with data elements in other devices. In some implementations, the configuration file 433 stores similar information as is stored in the change list(s) described above. In some implementations, a single change list, synchronization counter and device table can be maintained in the synchronization engine 430 (e.g., as part of the configuration file 433), in place of multiple, distributed change lists, synchronization counters and device tables.

In some implementations, the synchronization engine 430 can send and receive messages to and from a synchronization engine in a corresponding device. To do so, the synchronization engine 430 can operate in conjunction with one of the data adapter's change processors (e.g., change processor 421) to identify changes that should be applied to data elements in the corresponding device based on data elements in the device 401 that have changed since a previous synchronization. Once the synchronization engine 430 and appropriate change processor (e.g., change processor 421) have identified changes, the synchronization engine 430 can generate an appropriately formatted synchronization message with a group of identified changes (e.g., data elements identifiers and change instructions), and transmit the message, via an appropriate communication interface (e.g., communication interface 439). The synchronization engine 430 can also receive synchronization messages, decode their contents and interact with an appropriate data adaptor to apply the changes to appropriate data elements.

The synchronization engine 430 can also generate and receive acknowledgements to indicate that specific changes have been applied. In addition, the synchronization engine 430 can maintain mapping information (e.g., in a mapping file 434) between data elements stored in the device 401 and corresponding data elements stored in other peer devices. Moreover, the synchronization engine 430 can, in some implementations, receive mapping messages and update the mapping file 434 based on the content of a received mapping message; and generate mapping messages with mapping information to convey to another peer device.

As shown in one implementation in FIG. 4, the device 401 includes two communication interfaces 436 and 439. A device can have more or less than two communication interfaces. In implementations having multiple communication interfaces, each communication interface can implement a different type of communication. For example, in one implementation, the communication interface 436 may be a radio interface that can be employed to communicate, for example, with a cellular network (e.g., the network 143, shown in FIG. 1), and the communication interface 439 may be another, different radio interface, such as a Bluetooth interface.

In some implementations, the device 401 employs one communication interface to exchange data with certain devices, and the device 401 employs another communication interface to exchange data with other devices. In particular, for example, with reference to FIG. 1, the device 401 may employ the communication interface 436 to exchange data with the enterprise computing system 101, via the cellular network 143; and the device 401 may employ the interface 439 to exchange data with the accessory I/O device 107.

Multiple communication interfaces can implement different communication protocols or the same communication protocol, and the communication interfaces and protocols implemented can depend on the device itself. For example, with reference to FIG. 1, the enterprise computing system 101 can employ a wired USB interface via the enterprise terminal 140, and a wireless CDMA interface via the cellular network 143. As additional examples, the smartphone 104 can employ a wireless CDMA interface and a wireless Bluetooth interface, and the accessory I/O device 107 can employ a wireless Bluetooth interface and a wired IEEE 1394 interface. The interfaces described above are merely exemplary, and the reader will appreciate that any kind of data interface can be employed by the device to transfer data from one device to another device, or to synchronize data with the other device.

In some implementations, the device 401 has a modular design, in which different software applications, modules and protocols can be employed to implement different components. For example, some implementations adopt a layered approach to software or hardware design, where each layer has its own protocol or format it uses to communicate to a corresponding layer in another device. In particular, each layer, starting with an application layer and working down to lower-level protocols at a physical layer, can have its own communication protocol that abstracts the details of lower-level protocols.

To implement such a layered approach, each layer can be handled by different software or hardware modules. For example, the application 403 can comprise one software module, the synchronization engine 430 can comprise another module, each data adapter 409 or 412 can comprise another module, and each communication interface 436 or 439 can comprise another module. Such modularization can, in some implementations, yield efficiencies by facilitating reuse of various software modules. Moreover, such modularization can be based on whether corresponding functions are device-specific (e.g., specific to particular hardware or software components in the device 401) or device-independent. In some implementations, certain modules can be pre-optimized and pre-compiled software modules provided by third parties. For example, in some implementations, at least a portion of the synchronization engine 430 can be implemented by a SyncML component (Synchronization Markup Language—a platform-independent information synchronization standard), and can accordingly adopt a SyncML protocol of data exchange.

Components other than the synchronization engine 430 can also exchange data according to specific, possibly layered, protocols. For example, in some implementations, applications in one device can exchange data with applications in another device using WBXML, which is a binary representation of XML that can be used to compactly transfer files over mobile networks. Software modules at transport or network levels (e.g., according to the Open Systems Interconnection (OSI) basic reference model of communications) may employ HTTP or TCP, over IP. Data and physical layers may employ appropriate protocols for specific communication interfaces (e.g., CDMA, Bluetooth, IrDA, etc.). The above-described protocols are merely exemplary; any suitable protocol can be employed to facilitate synchronization of data between devices, and various layers of protocols can be employed based on any layering of components that perform synchronization of data between various applications. Moreover, the above description assumes software-based modules, but in some implementations, hardware-based modules can be used in place of or in addition to software-based modules.

Figure 5:
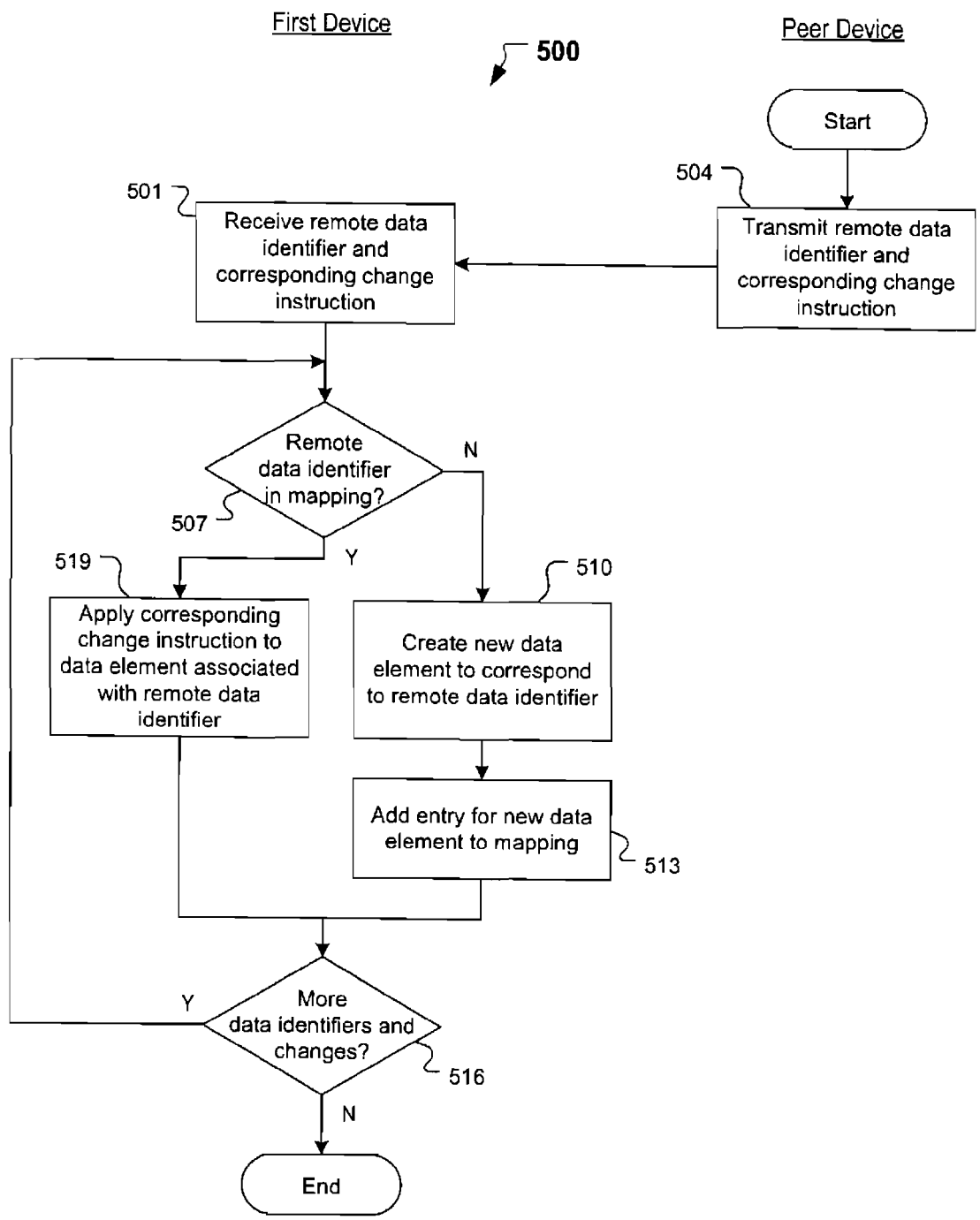
FIG. 5 is a flow diagram of an example method of synchronizing data.

FIG. 5 illustrates an example method 500 by which data elements in a first device can be synchronized with data elements in a peer device. The method 500 includes actions performed by the first device; other actions are performed by the peer device. For purposes of example, the method 500 could be performed by the accessory I/O device 107 in response to receiving a synchronization message from the smartphone 104.

In one implementation as shown, the method 500 can include receiving (501) a remote date identifier and corresponding change instruction that a peer device has transmitted (504). For example, with reference to FIG. 2A, the accessory I/O device 107 can receive (501) the synchronization message 232 that includes these change instructions and corresponding remote data identifiers ("Add A," "Add B" and "Add C"). In this example, A, B and C are remote data identifiers (e.g., in the sense that they are not local to the accessory I/O device 107, although they can be local to the smartphone 104). For purposes of example, each change instruction in the synchronization message 232 can be processed separately, starting with the "Add A" change instruction.

The method 500 can include determining (507) whether the remote identifier is included in a mapping maintained by the first device. For example, the accessory I/O device 107 can determine (507) whether the data identifier A is included in the mapping table 235. As depicted in FIG. 2A, the smartphone 104 (the example peer device) and the accessory I/O device 107 (the example first device) have not been synchronized before, so the mapping table 235 does not yet store relationship information about data identifier A. As a result, the accessory I/O device 107 determines (507) that the remote identifier A is not included in the mapping table 235, and the method 500 includes creating (510) a new data element to correspond to the remote identifier. In particular, for example, the accessory I/O device 107 can create (510) the data element i to correspond to the remote identifier A.

After the new data element is created (510), an entry can be added (513) to the mapping, for example, to track the relationship between the remote data identifier (e.g., A) and the newly added element (or more particularly, a data identifier i associated with the newly created element).

The method 500 can include determining (516) whether there are additional data identifiers and changes to process. For example, the accessory I/O device 107 can determine (516) that two other change instructions (Add B and Add C) in the synchronization message 238 must be processed. Accordingly, the method 500 can include processing these change as described above.

When a remote identifier is received (501), and it is determined (507) that the remote identifier is included in the mapping, then the change corresponding to the remote identifier can be applied (519) to an appropriate local data element that is associated with the remote data identifier. For example, with reference to FIG. 2E, accessory I/O device 107 can receive the synchronization message 257 that includes the remote data identifier 3, which is included in the mapping table 235. Accordingly the accessory I/O device 107 can apply the change ("Modify 3") to the data element that corresponds to the remote identifier 3 (data element iii). To identify the appropriate corresponding data element, the accessory I/O device 107 can query its mapping table 235 to locate the remote identifier 3, then identify the local data element (data element iii) that is associated with the remote identifier by the mapping table 235, and apply the corresponding change to the identified local data element.

Two types of changes (addition of new data elements and modification of existing data elements) have been described, but the reader will appreciate that the method 500 can be applied to other types of changes with only little or no modification (e.g., deleting data elements or marking data elements for archival on a peer device). Moreover, the method 500 can be performed sequentially, in different devices, to pass a synchronized version of data from one device to another. As described in the example scenario above, such a passing of data from one device to another device in a peer-to-peer manner can enable a user to employ various electronic devices to manage different kinds of information, even when one or more of the devices does not have access to a central repository of information, or when such a central repository of information is not maintained. Moreover, the peer-to-peer synchronization methods described in this document can enable a user to employ various similarly provisioned peer devices to manage his or her information, without forcing the user to install special server-client software on any of the devices or to specially configure any of the devices as either servers or clients.

A number of implementations have been described. Nevertheless, it will be understood that various modifications may be made without departing from the spirit and scope of the described implementations. Accordingly, other implementations are within the scope of the following claims.

What is claimed is:

1. A method of synchronizing data elements between devices, the method comprising:
   receiving at a first device, from only one of multiple peer devices with which the first device is configured to synchronize, a request to synchronize data between the first device and the only one peer device;
   identifying data elements stored in the first device that have changed since a previous synchronization operation between the first device and the only one peer device; and
   transmitting, directly and solely to the only one peer device, for each of the identified data elements, a local data identifier and a corresponding change to be applied to a data element in the only one peer device that corresponds to the local data identifier;
   wherein identifying the data elements comprises determining whether a device table that tracks synchronization operations between the first device and other peer devices includes an entry corresponding to the only one peer device;
   wherein identifying the data elements further comprises analyzing a change list that, for each change that has occurred since the previous synchronization operation, stores a data identifier that identifies the corresponding data element that has changed, a change operation that identifies the manner in which the corresponding data element has changed, and a counter value that provides a temporal reference for the change;
   wherein analyzing the change list comprises comparing the counter value of each entry in the change list to a counter value associated with an entry in the device table that corresponds to the only one peer device; further comprising updating the counter value associated with the entry in the device table upon completion of a synchronization event between the first device and the only one peer device; and
   further comprising processing the change list to determine whether any entries in the change list can be deleted, wherein processing the change list comprises comparing the counter value of each entry in the change list to a counter value associated with the entry in the device table that corresponds to the only one peer device.

2. The method of claim 1, wherein processing the change list further comprises deleting an entry in the change list whose counter value is less than a lowest counter value stored in the device table.

* * * * *